United States Patent
Herington

(10) Patent No.: US 7,797,756 B2
(45) Date of Patent: Sep. 14, 2010

(54) SYSTEM AND METHODS FOR MANAGING SOFTWARE LICENSES IN A VARIABLE ENTITLEMENT COMPUTER SYSTEM

(75) Inventor: Daniel E. Herington, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1155 days.

(21) Appl. No.: 11/406,418

(22) Filed: Apr. 18, 2006

(65) Prior Publication Data

US 2007/0245423 A1   Oct. 18, 2007

(51) Int. Cl.
G06F 17/30 (2006.01)
G06F 12/14 (2006.01)
G06F 9/50 (2006.01)
G06F 7/04 (2006.01)

(52) U.S. Cl. .............. 726/31; 726/21; 705/59; 709/224; 718/100; 718/104; 718/107

(58) Field of Classification Search .......... 726/21, 726/31; 705/59; 709/224; 718/100, 104, 718/107
See application file for complete search history.

(56) References Cited

U.S. PATENT DOCUMENTS

| | | | |
|---|---|---|---|
| 6,959,291 B1* | 10/2005 | Armstrong et al. | 705/59 |
| 7,096,469 B1* | 8/2006 | Kubala et al. | 718/100 |
| 2004/0249763 A1* | 12/2004 | Vardi | 705/59 |
| 2005/0049973 A1* | 3/2005 | Read et al. | 705/59 |
| 2005/0138422 A1* | 6/2005 | Hancock et al. | 713/201 |
| 2005/0216716 A1* | 9/2005 | Hoffman et al. | 713/1 |
| 2006/0143350 A1* | 6/2006 | Miloushev et al. | 710/242 |
| 2006/0259730 A1* | 11/2006 | Gimpl et al. | 711/173 |
| 2007/0112682 A1* | 5/2007 | Apparao et al. | 705/59 |
| 2008/0216081 A1* | 9/2008 | Jackson | 718/104 |

OTHER PUBLICATIONS

Bari, Paola et al. System Programmer's Guide to: Workload Manager, Nov. 2005.*

* cited by examiner

*Primary Examiner*—Michael J Simitoski

(57) ABSTRACT

Systems and methods are disclosed in which the software license for server partitions are flexible in that, as between two (or more, if desired) partitions the software licensed resources assigned to one partition can be used by the other partitions, providing a total number of resources do not exceeded the software license limit. In one embodiment, a workload manager monitors workload utilization to be sure that the total number of CPUs working on the application does not exceed the maximum under the software license. Users are notified when the workload's policy is about to be exceeded. In one embodiment, this could be a warning while in another embodiment additional software licenses can be activated, or a limit can be placed on the CPU use.

12 Claims, 2 Drawing Sheets

SYSTEM AND METHODS FOR MANAGING SOFTWARE LICENSES IN A VARIABLE ENTITLEMENT COMPUTER SYSTEM

FIELD OF THE INVENTION

This invention relates to computer systems and more specifically to systems and methods for managing software licenses in such systems.

DESCRIPTION OF RELATED ART

It has become common practice to base computer system software licensing fees on the number of CPUs available on a computer system. In such systems software licensing policies are based on the CPU count on the system. Most software support node partitions (nPars) and virtual partitions (vPars) are boundaries. However, if a workload manager (WLM) policy is defined for a workload running in a partition, it is possible that the maximum number of CPUs allowed by the WLM policy is higher than the number of CPUs allocated for the partition in which the workload is running. In that case, the workload will be limited by the WLM policy and can not use all of the available CPUs, even though the user is being charged for the number of CPUs available under the partition software license. For example, if the WLM software license allows only three CPUs for a workload, but the partition the workload is running on allows (by software license agreement) four CPUs, the user will not have as many CPUs as the user might otherwise be entitled, even if the additional CPUs are not otherwise engaged. On the other hand, if a partition has only two CPUs available (per the software license agreement), but the WLM allows four CPUs, the user is at risk of being out of compliance for software licenses.

BRIEF SUMMARY OF THE INVENTION

Systems and methods are disclosed in which the software licensing for server partitions are flexible, as between two (or more, if desired) partitions the software licensed resources assigned to one partition can be used by the other partitions, providing a total number of resources does not exceeded the software license limit. In one embodiment, a workload manager monitors workload utilization to be sure that the total number of CPUs working on the partitions running the software does not exceed the maximum under the software license. Users are notified when the workload's policy is about to exceed the limit. In one embodiment, this could be a warning while in another embodiment additional software licenses can be activated, or a limit can be placed on CPU use.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
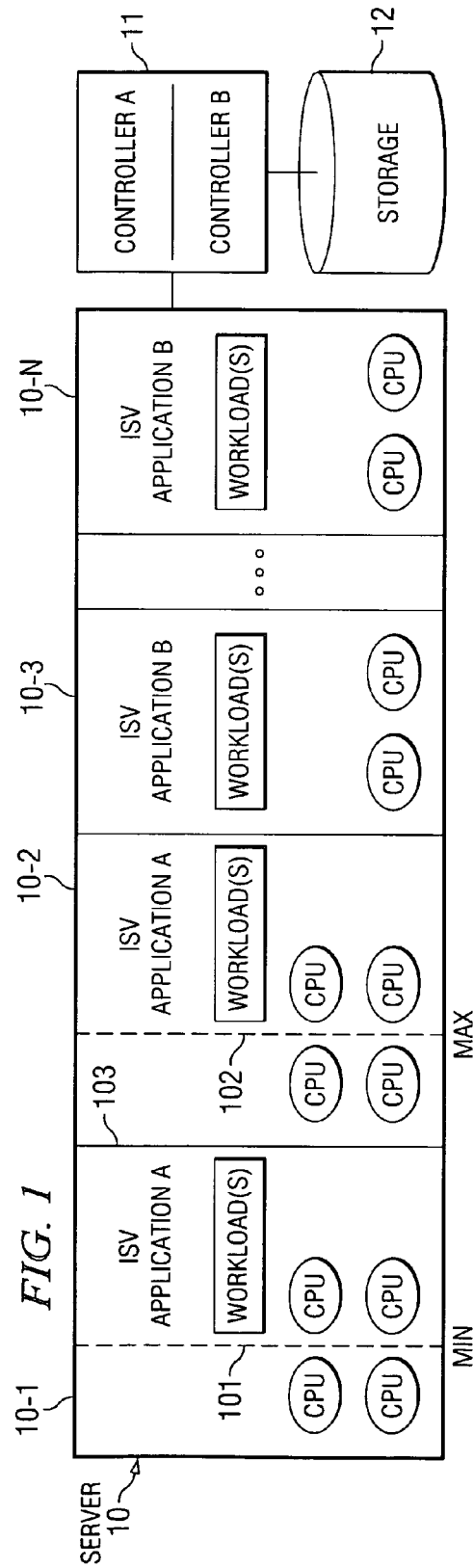
FIG. 1 shows one embodiment of a server having flexible partitions in accordance with aspects of the invention.

FIG. 1 shows one embodiment 10 of a server having flexible partitions such as flexible partitions 10-1, 10-2 in accordance with aspects of the invention. Controller 11 (including controllers A and B) together with storage 12 operate to establish the partitions and manage the WLM policy, so as to allow flexibility for users to reduce the cost of computing services. Note that while in the narrative CPUs will be utilized for illustration purposes, the same principals can be applied to other resources, such as, for example, memory, input/output devices, etc. for performing the functions desired.

Partitions 10-3 through 10-N are established in a well-known manner in which independent system vendor (ISV) applications, such as application B, can be loaded on several different partitions, each partition having an availability of two CPUs as shown. The number of CPUs that could be utilized within each partition is fixed at two. Thus, if other workloads or processors are running, say in partition 10-3, in which only one processor (CPU) is available, only that single processor would be utilized. In addition, if application B at some point in time would require three or four CPUs it could not utilize such additional resources. Similarly, if the user wanted to run several workloads using application B concurrently then the user in a typical system could use partitions 10-3, 10-4, 10-5, up to 10-N.

Partitions 10-1 and 10-2, referred to here as paired partitions, each partition having assigned to it four CPUs giving the combined paired partitions a maximum of eight CPUs that can be utilized. Note that while two partitions are shown, this concept can be extended to as many partitions as desired, providing the WLM has the rules associated therewith as will be discussed.

In operation then if a workload is to be run on partition 10-1 and at some point in time that workload (or multiple workloads) requires six CPUs, the flex partition shown by line 103 will move from its nominal position to position 102, so that partition 10-1's capability has grown to six CPUs while partition 10-2's capacity has shrunk to two CPUs, for that period of time, (example shown). In each partition 10-1 and 10-2 is flexible from two to six CPUs. This number is a contract matter and can be adjusted perhaps depended upon the cost per CPU or the resource allocated. Thus, assuming that it is desired to run a workload requiring six CPUs then the user would have to establish and pay for a partition that has at least six CPUs available. Since most of the time the six CPUs would not be required, that would be over capacity if the CPUs can not be "loaned" out. Since, however, it is possible for periods of time to "borrow" resources from a PAIRED partition, then the user can save on computing cost.

Figure 2:
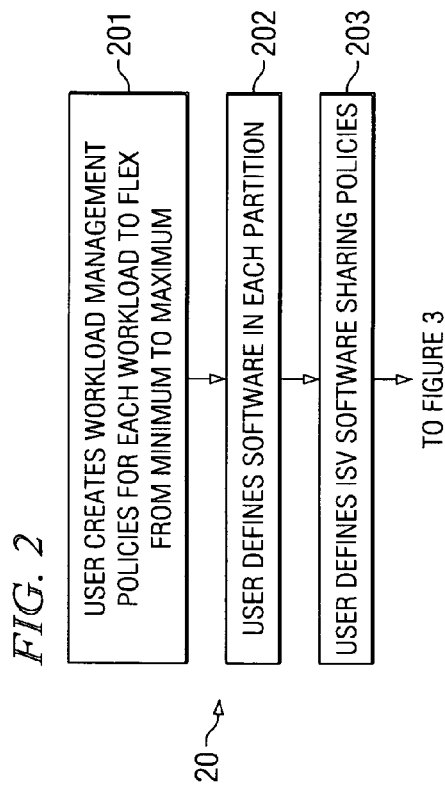
FIG. 2 shows one embodiment of a flow chart for establishing partition management.

FIG. 2 shows one embodiment 20 of a flow chart for establishing partition management. Thus, process 201 creates WLM policies for each workload in order to allow a partition to flex from a set minimal resource level (line 101) to a set maximum resource level (line 103). Different combinations of workload management levels could be assigned to different users on a permanent basis or for variable time intervals. Thus, the user can tailor what the user wants over a period of time and can change the flex arrangement as desired.

Process 202 defines the software in each partition. There is a definition of each software package (e.g., Oracle DB) that is running on each partition. This definition is used to ensure that the system keeps the actual number of CPUs allocated to all the partitions running a particular software package below the software licensed number for the software package.

In Process 203 the user defines the ISV software sharing policies that would take effect. This definition is in keeping with the number of software licenses available for all instances of each software package regardless of which partition is being run. These policies then go to the WLM (controller 11, FIG. 1) as stored, for example, in storage 12.

Figure 3:
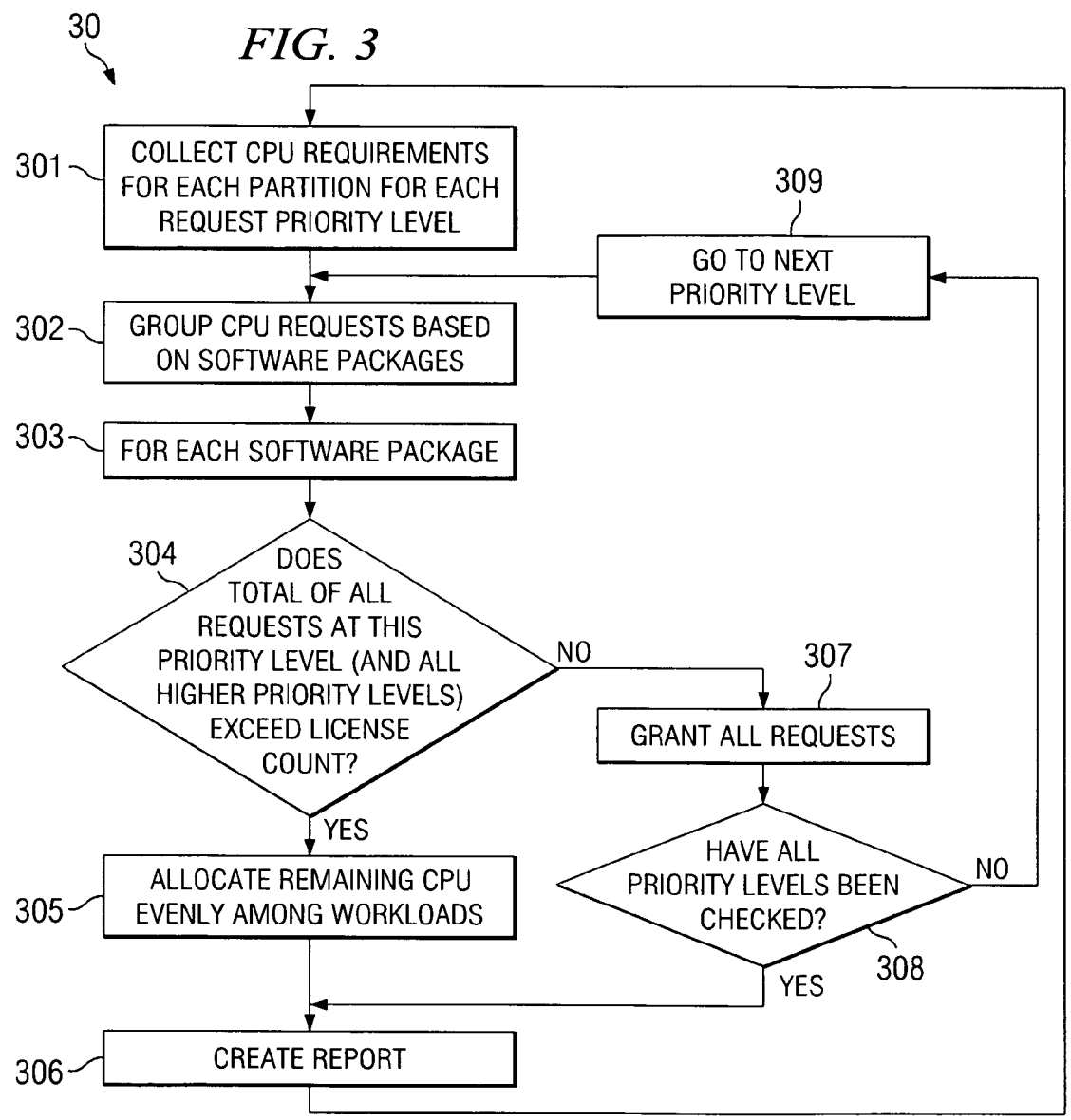
FIG. 3 shows one embodiment of partition management.

FIG. 3 shows one embodiment 30 of a partition management process in which process 301 collects CPU requirements for each partition and for each priority level. This is a basic workload management function and is well known in the art. Process 302 groups CPU (or other resource) requests based upon software packages. In this process each workload is matched to a CPU request for a software application.

Process 303 presents to process 304 each software package for each priority level, (starting with the top priority level), to determine if the total of all requests at that priority level (and all higher priority levels) exceeds the number of software licenses available. If there are more requests for CPUs than the software licenses allow, then process 305 allocates the remaining available licenses evenly among workloads. If desired, at that point process 306 can create a report. Since all software licenses are being used, there is no need to check lower priority workload requests.

If, however, process 304 determines that the number of requests does not exceed the number of software licenses then process 307 grants all requests. Process 308 then determines if all priority levels have been checked. If not, then process 309 directs process 302 to the next lowest priority and processes 302, 303, 304 are repeated.

If process 308 determines that all priority levels have been checked, then process 30 ends and process 316 can create a report if desired. Process 30 will restart, either by the elapse of time or by one or more requests for additional workload processing, or by a system manager, etc.

Note that process 30 is the monitoring process to determine and to police the functions to insure the ISV that in fact the rules have been obeyed. Not shown is the process by which the flexible partitions are established so that they move depending upon the CPUs utilized within each of the partition. This can be handled by a WLM that adjusts the partitions or by controller 11 or a combination thereof.

Using the arrangement discussed herein, the user would have flexibility to use workload management of ISV workloads in increments smaller than nPars and vPars—PSETs, for example. This could significantly lower the cost of software licenses when workload management is used to control how resources are allocated to ISV workloads. Using this approach, users would not be penalized for running more than one workload on a system or partition while the ISV is assured that the user will be warned that if they increase the maximum CPUs (or other utility) usage this could impact their software license compliances.

In one embodiment, users could get a report mapping of WLM workloads to the ISV applications that are running, as well as a report indicating where the ISV application is running.

Note that while two partitions are shown with a flexible partition between them, any one of the partitions can be set up to "borrow" resources from any other partition, if desired.

In the specification, references to computer-readable media are understood to refer to either transitory or non-transitory forms of media.

What is claimed is:

1. A computer-implemented method of administrating software licenses within a computer system, said method comprising:
    running an application on plural partitions;
    determining, in accordance with a user software license for said application, a maximum authorized quantity of a resource for said application; and
    managing said partitions to ensure that the total quantity of said resource allocated to said application does not exceed said maximum authorized quantity.

2. The method of claim 1 further comprising:
    requesting adjustments to said maximum authorized quantity when said managing determines a quantity is required that exceeds said maximum authorized quantity.

3. The method of claim 2 wherein said adjustment is on a temporary basis.

4. The method of claim 1 further comprising:
    reporting results of said managing to a user.

5. The method of claim 1 wherein said resources are selected from the list of: CPU, I/O, memory.

6. A software computer product having a non-transitory computer-readable storage media for controlling software licensed resource usage across partitions or a server; said software computer product comprising:
    code for allowing a set of software licensing rules to be established for assigning a certain number of resources to a partition, and
    code operating within said software licensing rules for establishing a maximum total number of resources that a certain combination of partitions can allocate to an application running on two or more of said partitions.

7. The software computer product of claim 6 further comprising:
    code operating within said software licensing rules for also establishing a minimum number of resources that a partition can have at said given time.

8. The software computer product of claim 6 wherein said resources are selected from the list of: CPU, I/O, memory.

9. The software computer product of claim 6 further comprising:
    code for monitoring said server to police said software licensing rules with respect to said resource use by said combination of partitions.

10. A server system for use in a computing system, said server system comprising:
    a server;
    means for partitioning said server and for assigning to each partition a number of available resources in accordance with a user software license; and
    means for allowing certain of said partitions to borrow available resources from at least one other partition while maintaining the number of resources in use at any one time by an application running on two or more of said partitions to within a maximum permitted under a license for said application.

11. The server system of claim 10 further comprising:
    means for monitoring said resource utilization at said partitions for compliance with said borrowing rules.

12. The server system of claim 10 further comprising:
    means for allocating all available resources under user software license across all partitions when the number of resources required in any partition is greater than the number of resources assigned to said particular partition.

* * * * *

UNITED STATES PATENT AND TRADEMARK OFFICE
CERTIFICATE OF CORRECTION

| | | |
|---|---|---|
| PATENT NO. | : 7,797,756 B2 | Page 1 of 1 |
| APPLICATION NO. | : 11/406418 | |
| DATED | : September 14, 2010 | |
| INVENTOR(S) | : Daniel E. Herington | |

It is certified that error appears in the above-identified patent and that said Letters Patent is hereby corrected as shown below:

On the title page, item (54), Title, in column 1, line 1, delete "SYSTEM" and insert -- SYSTEMS --, therefor.

In column 1, line 1, delete "SYSTEM" and insert -- SYSTEMS --, therefor.

In column 4, line 16, in Claim 5, delete "resources are" and insert -- resource is --, therefor.

In column 4, line 20, in Claim 6, delete "or" and insert -- of --, therefor.

In column 4, line 24, in Claim 6, delete "partition," and insert -- partition; --, therefor.

Signed and Sealed this
Thirty-first Day of May, 2011

David J. Kappos
*Director of the United States Patent and Trademark Office*